United States Patent
Gunner et al.

(10) Patent No.: US 10,101,090 B2
(45) Date of Patent: Oct. 16, 2018

(54) DUCT CLEANING AND VALVE DEVICE FOR FURNACE SYSTEM

(71) Applicant: Owens-Brockway Glass Container Inc., Perrysburg, OH (US)

(72) Inventors: Bruce Gunner, Maumee, OH (US); Witold Mastek, Perrysburg, OH (US); Jeffrey Alexander, Beverly, MA (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 44 days.

(21) Appl. No.: 15/213,063

(22) Filed: Jul. 18, 2016

(65) Prior Publication Data

US 2018/0017330 A1    Jan. 18, 2018

(51) Int. Cl.

| | |
|---|---|
| *F23J 3/06* | (2006.01) |
| *F23J 3/02* | (2006.01) |
| *F27D 25/00* | (2010.01) |
| *F27D 13/00* | (2006.01) |
| *C03B 3/02* | (2006.01) |

(Continued)

(52) U.S. Cl.
CPC .......... *F27D 25/001* (2013.01); *C03B 3/023* (2013.01); *F27D 3/04* (2013.01); *F27D 13/002* (2013.01); *F27D 17/004* (2013.01)

(58) Field of Classification Search
CPC .............. B01D 33/466; B01D 46/0065; B01F 15/00019; A47L 9/0411; F23J 3/02; C03B 5/205

See application file for complete search history.

(56) References Cited

U.S. PATENT DOCUMENTS

| | | |
|---|---|---|
| 3,737,554 A | 6/1973 | Horibe et al. |
| 3,878,798 A | 4/1975 | Du-Chambon |

(Continued)

FOREIGN PATENT DOCUMENTS

| | | |
|---|---|---|
| JP | 2002-168432 A | 6/2002 |
| JP | 2002-168433 A | 6/2002 |

(Continued)

OTHER PUBLICATIONS

English language abstract of Japanese Publication No. 2002-168432.

(Continued)

*Primary Examiner* — Gregory A Wilson

(57) ABSTRACT

A furnace system includes a furnace and a preheater configured to preheat material before it enters the furnace. The system further includes a duct system including a mixing chamber disposed between the furnace and preheater. The duct system further includes an exhaust duct in fluid communication with an exhaust fluid outlet of the furnace and configured to vent fluid exhausted from the furnace. The exhaust duct is in fluid communication with the mixing chamber and configured to redirect a portion of the fluid exhausted from the furnace to the mixing chamber. The duct system further includes a preheater duct in fluid communication with the mixing chamber and a fluid inlet of the preheater and configured to direct fluid from the mixing chamber to the preheater. The system further includes a duct scraper configured for movement within the mixing chamber to move particulates from the mixing chamber into the exhaust duct.

21 Claims, 3 Drawing Sheets

(51) Int. Cl.
*F27D 3/04* (2006.01)
*F27D 17/00* (2006.01)

(56) References Cited

U.S. PATENT DOCUMENTS

| | | | |
|---|---|---|---|
| 4,099,953 A | 7/1978 | Rondeaux et al. | |
| 4,278,459 A | 7/1981 | Partus | |
| 4,407,669 A | 10/1983 | Nelson | |
| 4,528,012 A | 7/1985 | Sturgill | |
| 4,872,834 A * | 10/1989 | Williams, Jr. | F23J 3/00 |
| | | | 15/104.096 |
| 4,875,919 A | 10/1989 | DeSaro et al. | |
| 4,969,942 A * | 11/1990 | Schwenninger | C03B 5/12 |
| | | | 134/34 |
| 5,052,312 A | 10/1991 | Rackley et al. | |
| 5,513,206 A * | 4/1996 | Mori | C21C 5/565 |
| | | | 373/80 |
| 5,889,810 A | 3/1999 | Katayama et al. | |
| 6,447,288 B1 * | 9/2002 | De Saro | F27B 14/06 |
| | | | 432/101 |
| 6,615,612 B2 | 9/2003 | Alexander | C03B 3/023 |
| | | | 65/134.6 |
| 6,689,309 B1 | 2/2004 | Ranki | |
| 8,317,926 B2 | 11/2012 | Reynoldson | |
| 8,555,453 B2 * | 10/2013 | Winkler | F27D 25/001 |
| | | | 15/236.01 |
| 8,939,093 B2 | 1/2015 | Mero | |
| 2011/0203988 A1 * | 8/2011 | Gaudfrin | B01D 33/21 |
| | | | 210/413 |
| 2011/0314966 A1 | 12/2011 | Iijima et al. | |
| 2013/0154167 A1 * | 6/2013 | Mizutani | C21B 13/105 |
| | | | 266/46 |
| 2014/0007622 A1 * | 1/2014 | Shock | C03B 5/183 |
| | | | 65/135.9 |
| 2014/0208994 A1 | 7/2014 | Cohen et al. | |

FOREIGN PATENT DOCUMENTS

| | | |
|---|---|---|
| JP | 2004-003761 A | 1/2004 |
| JP | 2005-326111 A | 11/2005 |

OTHER PUBLICATIONS

English language abstract of Japanese Publication No. 2002-168433.

English language abstract of Japanese Publication No. 2004-003761.

English language abstract of Japanese Publication No. 2005-326111.

International Search Report and Written Opinion, Int. Serial No. PCT/US2017/038710, Int. Filing Date: Jun. 22, 2017, Applicant: Owens-Brockway Glass Container Inc., dated Oct. 4, 2017.

* cited by examiner

DUCT CLEANING AND VALVE DEVICE FOR FURNACE SYSTEM

BACKGROUND a. Technical Field

This disclosure relates to furnace systems. In particular, the disclosure relates to a furnace system having a mechanism for removing particulate matter in ductwork that is used to route exhaust gases from the furnace to a preheater.

b. Background Art

In a glass melting furnace system, a preheater is used to preheat cullet (recycled broken glass) and other batch materials that are then fed to a glass melting furnace along with other raw materials. Heat in the preheater is generated, at least in part, by directing at least a portion of the exhaust fluid from the furnace to the preheater through ductwork. The ductwork includes an exhaust duct that carries exhaust fluid from the furnace and a mixing chamber in fluid communication with the exhaust duct where at least a portion of the exhaust gas is mixed with air to regulate the temperature of the fluid before delivery to the preheater. A valve may be disposed between the exhaust duct and mixing chamber to close the fluid path in appropriate circumstances.

Particulates such as dust in the exhaust duct tends to collect on surfaces of the mixing chamber and on the edges of the valve. The buildup of particulates restricts the flow of fluid and impacts the performance of the preheater. Removal of particulates is done manually and requires significant resources in terms of labor and downtime of the furnace system.

The inventors herein have recognized a need for a furnace system that will minimize and/or eliminate one or more of the above-identified deficiencies.

BRIEF SUMMARY OF THE DISCLOSURE

This disclosure relates to furnace systems. In particular, the disclosure relates to a furnace system having a mechanism for removing particulate matter in ductwork that is used to route exhaust gases from the furnace to a preheater.

A furnace system in accordance with one embodiment of the present teachings includes a furnace having an exhaust fluid outlet. The system further includes a preheater configured to preheat material before the material is provided to the furnace. The preheater has a fluid inlet. The system further includes a duct system including a mixing chamber disposed between the furnace and the preheater. The duct system further includes an exhaust duct in fluid communication with the exhaust fluid outlet and configured to vent fluid exhausted from the furnace. The exhaust duct is in fluid communication with the mixing chamber and configured to redirect a portion of the fluid exhausted from the furnace to the mixing chamber. The duct system further includes a preheater duct in fluid communication with the mixing chamber and the preheater fluid inlet and configured to direct fluid from the mixing chamber to the preheater. The system further includes a duct scraper configured for movement within the mixing chamber to move particulates out of the mixing chamber.

A furnace system in accordance with another embodiment of the present teachings includes a furnace having an exhaust fluid outlet. The system further includes a preheater configured to preheat material before the material is provided to the furnace. The preheater has a fluid inlet. The system further includes a duct system including a mixing chamber disposed between the furnace and the preheater. The duct system further includes an exhaust duct in fluid communication with the exhaust fluid outlet and configured to vent fluid exhausted from the furnace. The exhaust duct is in fluid communication with the mixing chamber and configured to redirect a portion of the fluid exhausted from the furnace to the mixing chamber. The duct system further includes a preheater duct in fluid communication with the mixing chamber and the preheater fluid inlet and configured to direct fluid from the mixing chamber to the preheater. The system further includes means for moving particulates out of the mixing chamber.

A furnace system in accordance with the present teachings is advantageous relative to conventional furnace systems. In particular, the dust scraper enables removal of particulates from the mixing chamber-thereby improving the operating efficiency of the preheater—and does so without manual intervention or extended downtime for the system.

The foregoing and other aspects, features, details, utilities, and advantages of the disclosed system will be apparent from reading the following detailed description and claims, and from reviewing the accompanying drawings illustrating features of this system by way of example.

DETAILED DESCRIPTION

Figure 1:
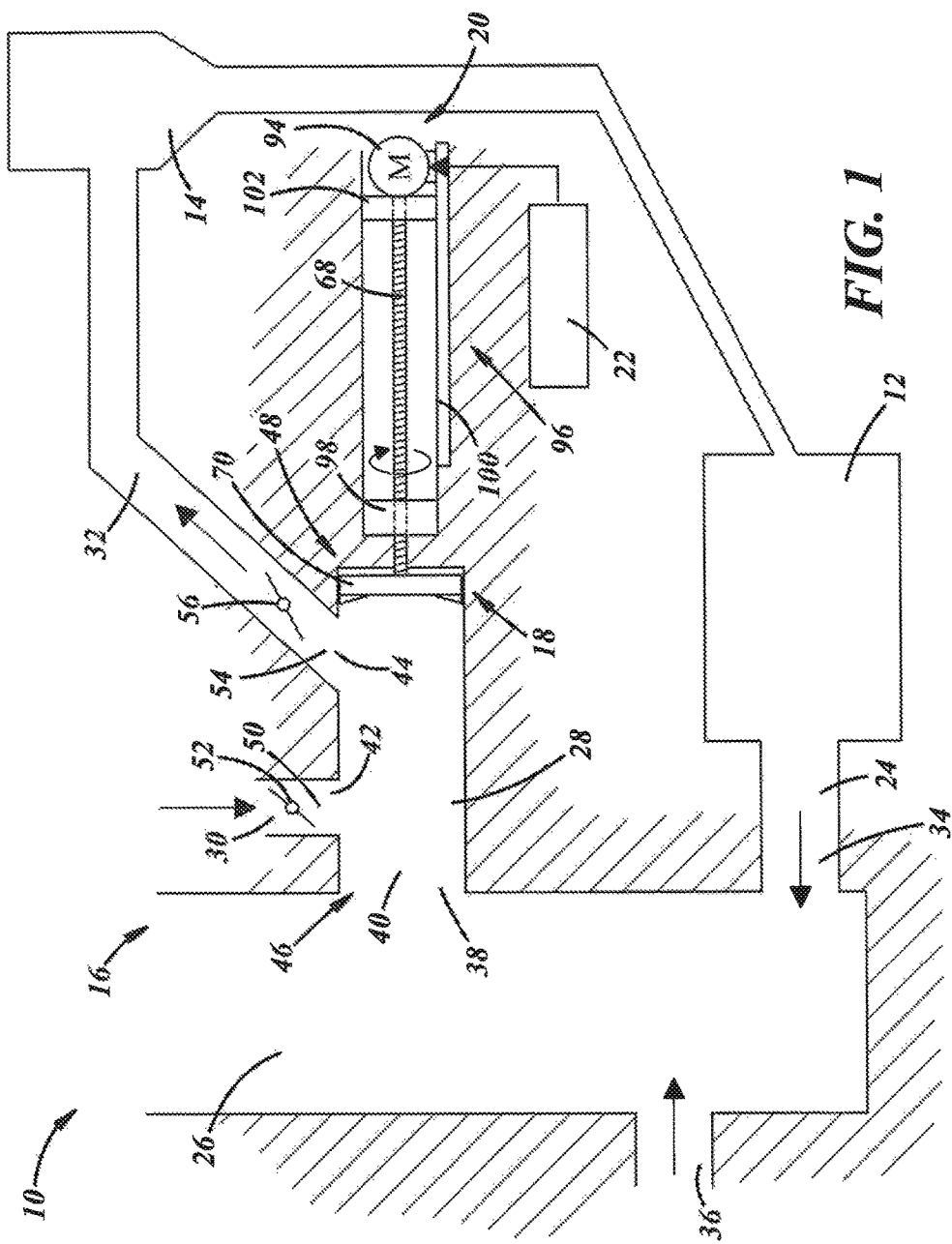
FIG. 1 is a schematic and cross-sectional drawing of a furnace system in accordance with one embodiment of the present teachings.

Referring now to the drawings wherein like reference numerals are used to identify identical components in the various views, FIG. 1 illustrates a furnace system 10 in accordance with one embodiment of the present teachings. System 10 is provided to melt raw materials for use in forming objects or products. System 10 may comprise, for example, a glass melting furnace system for use in melting silica sand, soda ash (sodium carbonate), limestone and cullet (recycled broken glass) into molten glass. System 10 may include a furnace 12, a preheater 14 and a duct system 16. In accordance with the present teachings, system 10 further includes means, such as duct scraper 18, for moving particulates that accumulate within the duct system 16 and means, such as a motor drive unit 20 and controller 22, for controlling movement of the duct scraper 18.

Furnace 12 is provided to melt raw materials. As noted above, in one embodiment furnace 12 may comprise a glass melting furnace that melts silica sand, soda ash, limestone and cullet into molten glass. Furnace 12 may have an operating temperature of about 1565 degrees Celsius (2850 degrees Fahrenheit). Furnace 12 may generate heat using natural gas and preheated combustion air. Furnace 12 may also augment the heat using an electric boost system. Excess heat may be exhausted from furnace 12 through an exhaust fluid outlet 24.

Preheater 14 is provided to preheat materials before they are introduced into furnace 12 to improve the operating efficiency of furnace 12. In the glass melting furnace system reference above, preheater 14 comprises a cullet preheater that is used to preheat cullet before the cullet is provided to furnace 12. The cullet preheater 14 may comprise a direct contact raining bed counterflow preheater in which cullet is introduced at one end of the preheater and flows through the preheater around deflector plates under gravitational forces while heat is introduced into the opposite end of the preheater and flows in the opposite direction to the cullet. It should be understood, however, that other conventional forms of preheaters 14, for cullet, raw batch materials, or the like may alternatively be used in glass melting furnace systems.

Duct system 16 is provided to route fluids between furnace 12, preheater 14 and other components (not shown) of system 10 as well as the atmosphere (for air intake and byproduct exhaustion). System 16 is made from materials sufficient to withstand the anticipated operating temperatures in the components of system 10 and may be made from steel in some embodiments. System 16 may include an exhaust duct 26, a mixing chamber 28, an air intake duct 30, and a preheater duct 32. It should be understood, however, that additional ducts may form a part of duct system (e.g., a portion of fluid exhausted from preheater 14 could be routed back to the mixing chamber 28 through a recirculation duct).

Exhaust duct 26 exhausts fluid from furnace 12. Exhaust duct 26 defines a fluid inlet 34 in fluid communication with the exhaust fluid outlet 24 in furnace 12. Exhaust duct 26 may also define a fluid inlet 36 in communication with a source of fluid having a lower temperature than the fluid exhausted by furnace 12 in order to reduce or dilute the temperature of the fluid exhausted by furnace 12. Inlet 36 may, for example deliver exhaust fluid from preheater 14 to duct 26. When the preheater 14 is off a fan in ductwork leading to inlet 36 may be used to drive another source of fluid into duct 26. Exhaust duct 26 may vent a portion of the fluid exhausted from furnace 12 to atmosphere through an exhaust fluid outlet (not shown). Exhaust duct 26 is also configured, however, to redirect at least a portion of the fluid exhausted from furnace 12 for use in heating the cullet in preheater 14. Exhaust duct 26 may therefore include an exhaust fluid outlet 38 in fluid communication with mixing chamber 28.

Mixing chamber 28 is provided to allow temperature control of fluid prior to introduction to preheater 14. Mixing chamber 28 is disposed between furnace 12 and preheater 14. Mixing chamber 28 has a plurality of fluid inlets 40, 42 at which chamber 28 is joined to exhaust duct 26 and air intake duct 30, respectively, and a fluid outlet 44 at which chamber 28 is joined to preheater duct 32. Mixing chamber 28 may be generally cylindrical in shape with one end 46 terminating in fluid inlet 40 opening into exhaust duct 26 and an opposite end 48 that is substantially closed. Fluid inlet 42 and fluid outlet 44 may be formed in a side wall of chamber 24 between the two ends 46, 48.

Air intake duct 30 provides recycled air from the exhaust of preheater 14 to mixing chamber 28 to mix with exhaust fluid from exhaust duct 26 in order to control the temperature of the fluid before introduction to preheater 14. Air intake duct 30 defines a fluid outlet 50 at one end opening into inlet 42 of mixing chamber 28. A mechanically or electrically controlled valve 52 may be disposed within air intake duct 30 to control the amount of air that flows into mixing chamber 28 from air intake duct 30.

Preheater duct 32 is provided to direct fluid from mixing chamber 28 to preheater 14. Preheater duct 32 is in fluid communication with mixing chamber 28 and joins mixing chamber 28 at a location between ends 46, 48 of mixing chamber 28. Preheater duct 32 defines a fluid inlet 54 at one end opening into outlet 44 of mixing chamber 28. A mechanically or electrically controlled valve 56 may be disposed within preheater duct 32 to control the amount of air that flows from mixing chamber 28 to preheater 14.

Figure 2:
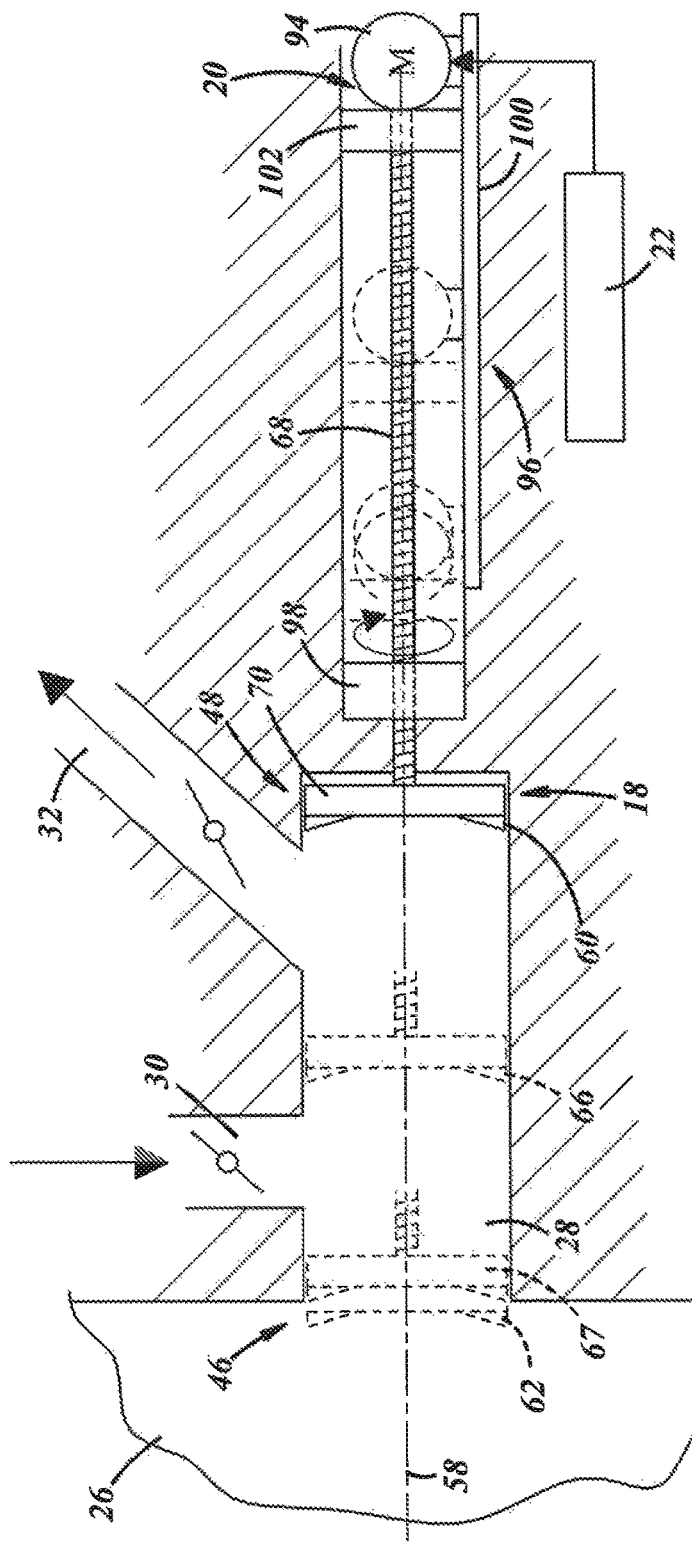
FIG. 2 is a schematic and cross-sectional drawing of the furnace system of FIG. 1 illustrating various positions of a duct scraper within the furnace system.

Duct scraper 18 provides a means for moving particulates out of the mixing chamber 28 and into the exhaust duct 26. Because the mixing chamber 28 receives fluid from the exhaust duct 26, particulates such as dust in the exhaust duct 26 tend to collect on surfaces within the mixing chamber 28 as well as on the edges of a valve that is normally located proximate end 46 of the mixing chamber 28. Duct scraper 18 is provided to allow automated removal of the particulates from mixing chamber 28 thereby eliminating the need for manual removal of the particulates and reducing labor costs and system downtime. Referring to FIG. 2, duct scraper 18 is configured for translational movement along a roll axis 58 between a retracted position 60 where duct scraper is located proximate end 48 of mixing chamber 28 to an extended position 62 proximate end 46 of mixing chamber 28. Duct scraper 18 may further be configured to rotate about roll axis 58. Movement along and about axes 58 enables duct scraper 18 to scrape the surfaces of mixing chamber 28 while movement along axis 58 from the retracted position 60 to the extended position 62 allows duct scraper 18 to push the particulate back into exhaust duct 26. In addition to positions 60, 62, duct scraper 18 may also be configured to assume intermediate positions 66, 67 between positions 60, 62. In position 67, duct scraper 18 serves as a replacement for the conventional valve. Duct scraper 18 may include a rod 68 and a disc 70 disposed at one end of rod 68.

Figure 3:
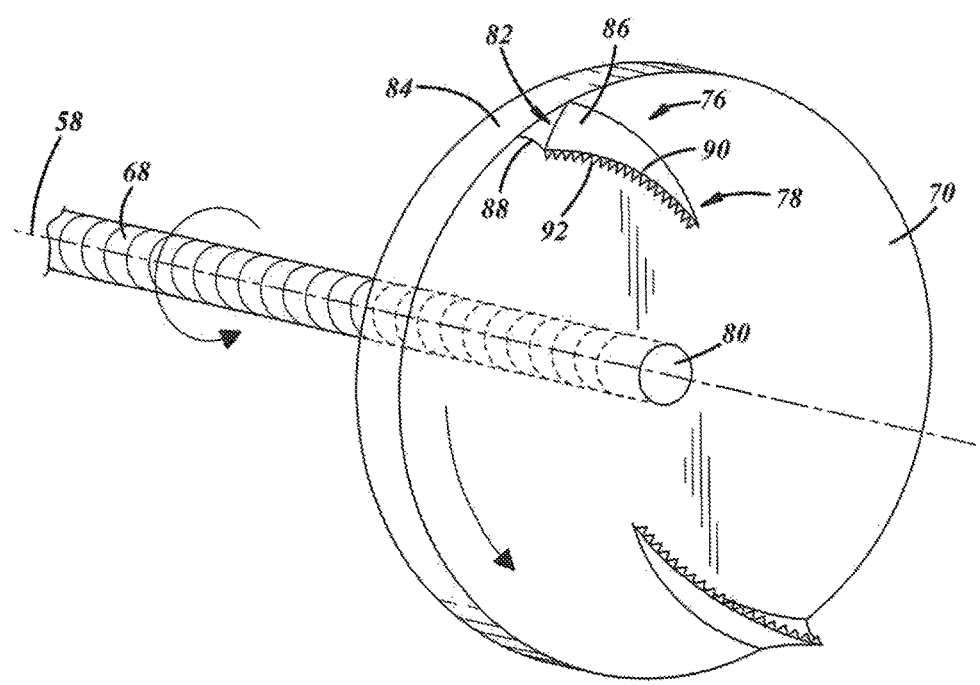
FIG. 3 is a perspective view of a duct scraper in accordance with one embodiment of the present teachings for use in the furnace system of FIG. 1.

Referring to FIG. 3, rod 68 is provided to support disc 70 for movement within mixing chamber 28 along and about roll axis 58. Rod 68 may be made from high temperature metal alloys. Rod 68 is disposed about, and may be centered about, axis 58. Rod 68 extends through an opening in an end wall of mixing chamber 28 at end 48 of chamber 28 and supports disc 70 on one end. Rod 68 may be threaded. In some embodiments, rod 68 may define a fluid passage extending along at least a portion of the length of rod 68 and configured to permit circulation of a cooling fluid from a fluid source (not shown) along the length of rod 68 and potentially to disc 70.

Disc 70 is provided to scrape the surfaces of mixing chamber 28 in order to remove dust and other particulates and to push those particulates out of mixing chamber 28 into exhaust duct 26. Disc 70 may be made from high temperature metal alloys. Disc 70 may also function as a valve depending on the location of disc 70 within mixing chamber 28. Disc 70 may be substantially round and is mounted on end of rod 68. In some embodiments, disc 70 may define a hollow or fluid passage in fluid communication with a passage formed in rod 68 and configured to permit circulation of cooling fluid within disc 70. Disc 70 may define a plurality of blades 76 on one side of disc 70 facing into mixing chamber 28. In the illustrated embodiment, disc 70 includes two blades 76 located on diametrically opposite portions of disc 70. It should be understood, however, that the number of blades 76 may vary. Although the shape of the blades 76 may also vary, in one embodiment each blade 76 has a radially inner end 78 that terminates at a location distant from the center 80 of disc 70 and a radially outer end 82 that terminates at the radially outer edge 84 or periphery of disc 70. The cross-sectional profile of each blade 76 is substantially triangular and increases in size moving from end 78 to end 82. The generally radially extending surfaces 86, 88 of each blade 76 may also curve moving from end 78 to end 82 and may define a generally radially extending edge 90 that includes a plurality of teeth 92.

Although duct scraper 18 has been described and illustrated as a preferred means for moving particulates out of the mixing chamber 28 and into the exhaust duct 26, it should be understood that alternative means could be use in place of duct scraper 18. For example, a non-rotatable disc or plow that only has translation movement along axis 58 could potentially be used in place of duct scraper 18.

Referring again to FIGS. 1 and 2, motor drive unit 20 is provided to cause movement of duct scraper 18 along and about axis 58 in order to move duct scraper 18 within mixing chamber 28 between the retracted and extended positions 60, 62 and any position (e.g., intermediate positions 66, 67) therebetween. Motor drive unit 20 may include an electric motor 94 and a drive assembly 96 configured to translate torque from the motor into translational and rotational movement of rod 58. The drive assembly 96 may include, for example, an internally threaded base 98 configured to engage rod 68 and through which rod 68 may extend, a rail 100 and a gearbox or reduction unit 102. The motor 94 and reduction unit cause rotation of threaded rod 68. The rotation of rod 68 within the fixed, internally threaded base 98 causes translational movement of rod 68 along with motor 94 and reduction unit 102 which move along rail 100 in a direction parallel to roll axis 58.

Controller 22 controls the operation of motor 94 to control movement of duct scraper 18 within mixing chamber 28. Controller 22 may comprise a programmable microprocessor or microcontroller or may comprise an application specific integrated circuit (ASIC). Controller 22 may include a central processing unit (CPU) and an input/output (I/O) interface through which controller 22 may receive a plurality of input signals including those used to set parameter values relating to the operation of duct scraper 18 or detect conditions impacting the operation of duct scraper 18 and generate a plurality of output signals including those used to control motor 94. Controller 22 may be configured with appropriate programming instructions (i.e. software) to activate motor 94 at a predetermined frequency in order to periodically remove particulates from mixing chamber 28. Controller 22 may be further configured to position duct scraper 18 in the intermediate positions 66, 67 when conditions dictate that the duct scraper 18 function as a valve between exhaust duct 26 and preheater duct 32 or as a valve, respectively.

A furnace system 10 in accordance with the present teachings is advantageous relative to conventional furnace systems. In particular, the duct scraper 18 enables removal of particulates from the mixing chamber 28—thereby improving the operating efficiency of the preheater 14—and does so without manual intervention or extended downtime for the system 10.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

What is claimed is:

1. A furnace system, comprising:
   a furnace having an exhaust fluid outlet;
   a preheater configured to preheat material before the material is provided to the furnace through a first conduit extending between the preheater and the furnace, the preheater having a fluid inlet;
   a duct system forming a second conduit between the furnace and preheater, the second conduit different from the first conduit, the duct system including
     a mixing chamber disposed between the furnace and the preheater;
     an exhaust duct in fluid communication with the exhaust fluid outlet and configured to vent fluid exhausted from the furnace, the exhaust duct in fluid communication with the mixing chamber and configured to redirect a portion of the fluid exhausted from the furnace to the mixing chamber whereby particulates from the exhaust duct collect on surfaces of the mixing chamber;
     a preheater duct in fluid communication with the mixing chamber and the preheater fluid inlet and configured to direct fluid from the mixing chamber to the preheater;
   a duct scraper configured for movement within the mixing chamber to scrape the surfaces of the mixing chamber and move the particulates out of the mixing chamber.

2. The furnace system of claim 1 wherein the duct scraper is further configured to movement within the mixing chamber to move particulates out of the mixing chamber and into the exhaust duct.

3. The furnace system of claim 1 wherein the duct scraper includes a rod extending through an opening in the mixing chamber and a disc disposed on one end of the rod.

4. The furnace system of claim 3 wherein the disc defines a plurality of blades, each of the blades having a radially inner end and a radially outer end and a cross-sectional profile that increases in size moving from the radially inner end to the radially outer end.

5. The furnace system of claim 4 wherein a surface of each of the blades curves moving from the radially inner end to the radially outer end.

6. The furnace system of claim 4 wherein the radially outer end of each of the blades terminates at a radially outer periphery of the disc.

7. The furnace system of claim 1 wherein the furnace comprises a glass furnace and the preheater comprises a cullet preheater.

8. The furnace system of claim 1 wherein the mixing chamber includes an inlet coupled to an intake duct through which recycled exhaust fluids from the preheater are delivered to the mixing chamber for mixing with the portion of the fluid exhausted from the furnace.

9. A furnace system comprising:
   a furnace having an exhaust fluid outlet;
   a preheater configured to preheat material before the material is provided to the furnace through a first conduit extending between the preheater and the furnace, the preheater having a fluid inlet;
   a duct system forming a second conduit between the furnace and preheater, the second conduit different from the first conduit, the duct system including
     a mixing chamber disposed between the furnace and the preheater;
     an exhaust duct in fluid communication with the exhaust fluid outlet and configured to vent fluid exhausted from the furnace, the exhaust duct in fluid communication with the mixing chamber and configured to redirect a portion of the fluid exhausted from the furnace to the mixing chamber whereby particulates from the exhaust duct collect on surfaces of the mixing chamber;

a preheater duct in fluid communication with the mixing chamber and the preheater fluid inlet and configured to direct fluid from the mixing chamber to the preheater;

a duct scraper configured for movement within the mixing chamber to move particulates out of the mixing chamber wherein the mixing chamber has a first end opening into said exhaust duct and a second end opposite the first end, the duct scraper configured for movement along a roll axis between a retracted position proximate the second end of the mixing chamber and an extended position proximate the first end of the mixing chamber.

10. The furnace system of claim 9 wherein the duct scraper is further configured to rotate about the roll axis.

11. The furnace system of claim 9 wherein the duct scraper is configured to function as a valve between the mixing chamber and the exhaust duct when in the extended position.

12. The furnace system of claim 9 wherein the preheater duct opens into the mixing chamber at a location between the first and second ends of the mixing chamber.

13. The furnace system of claim 9, further comprising:
a motor configured to cause movement of the duct scraper within the mixing chamber from the retracted position to the extended position and from the extended position to the retracted position; and,
a controller configured to activate the motor at a predetermined frequency.

14. A furnace system, comprising:
a furnace having an exhaust fluid outlet;
a preheater configured to preheat material before the material is provided to the furnace through a first conduit extending between the preheater and the furnace, the preheater having a fluid inlet;
a duct system forming a second conduit between the furnace and preheater, the second conduit different from the first conduit, the duct system including
a mixing chamber disposed between the furnace and the preheater;
an exhaust duct in fluid communication with the exhaust fluid outlet and configured to vent fluid exhausted from the furnace, the exhaust duct in fluid communication with the mixing chamber and configured to redirect a portion of the fluid exhausted from the furnace to the mixing chamber whereby particulates from the exhaust duct collect on surfaces of the mixing chamber;
a preheater duct in fluid communication with the mixing chamber and the preheater fluid inlet and configured to direct fluid from the mixing chamber to the preheater;
means for moving particulates out of the mixing chamber.

15. The furnace system of claim 14 wherein the moving means move particulates out of the mixing chamber and into the exhaust duct.

16. The furnace system of claim 14 wherein the mixing chamber has a first end opening into the exhaust duct and a second end opposite the first end, the moving means configured for movement along a roll axis between a retracted position proximate the second end of the mixing chamber and an extended position proximate the first end of the mixing chamber.

17. The furnace system of claim 16 wherein the moving means is further configured to rotate about the roll axis.

18. The furnace system of claim 16 wherein the moving means is further configured to function as a valve between the mixing chamber and the exhaust duct when in the extended position.

19. The furnace system of claim 16 wherein the preheater duct opens into the mixing chamber at a location between the first and second ends of the mixing chamber.

20. The furnace system of claim 14, further comprising:
a motor configured to cause movement of the moving means within the mixing chamber from the retracted position to the extended position and from the extended position to the retracted position; and,
a controller configured to activate the motor at a predetermined frequency.

21. The furnace system of claim 14 wherein the furnace comprises a glass furnace and the preheater comprises a cullet preheater.

* * * * *